(12) United States Patent
Kang et al.

(10) Patent No.: US 10,847,281 B2
(45) Date of Patent: Nov. 24, 2020

(54) POWER CABLE AND POWER ADAPTOR INCLUDING SAME

(71) Applicant: SAMSUNG ELECTRONICS CO., LTD., Suwon-si (KR)

(72) Inventors: Jeong-il Kang, Yongin-si (KR); Hyun-young Jang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/467,111

(22) PCT Filed: Mar. 8, 2017

(86) PCT No.: PCT/KR2017/002488
§ 371 (c)(1),
(2) Date: Jun. 6, 2019

(87) PCT Pub. No.: WO2018/139702
PCT Pub. Date: Aug. 2, 2018

(65) Prior Publication Data
US 2019/0318842 A1    Oct. 17, 2019

(30) Foreign Application Priority Data

Jan. 25, 2017  (KR) .......... 10-2017-0012008

(51) Int. Cl.
*H05K 7/02*    (2006.01)
*H05K 7/04*    (2006.01)
(Continued)

(52) U.S. Cl.
CPC ......... *H01B 7/0823* (2013.01); *H01B 7/0216* (2013.01); *H01B 13/06* (2013.01);
(Continued)

(58) Field of Classification Search
USPC .......................................... 361/812
See application file for complete search history.

(56) References Cited

U.S. PATENT DOCUMENTS 5,296,648 A * 3/1994 Johnson ............... H05B 3/56
174/117 F
6,054,846 A * 4/2000 Castleman ............ G05F 1/577
307/31
(Continued)

FOREIGN PATENT DOCUMENTS

AU    776328 B2   10/2001
CN   202601253 U   12/2012
(Continued)

OTHER PUBLICATIONS

Communication dated Nov. 11, 2019, issued by the European Patent Office in counterpart European Application No. 17894449.2.
(Continued)

*Primary Examiner* — Hung S. Bui
(74) *Attorney, Agent, or Firm* — Sughrue Mion, PLLC

(57) ABSTRACT

A power cable and a power adaptor including the same are disclosed. The disclosed power adaptor comprises: an adaptor body; and a cable connected to the adaptor body, wherein the cable includes a plurality of conducting wires, which are arranged to be spaced in parallel to one another, and an outer skin, made of a transparent material, surrounding the plurality of conducting wires.

13 Claims, 25 Drawing Sheets

(51) Int. Cl.
*H01B 7/08* (2006.01)
*H01B 7/02* (2006.01)
*H01B 13/06* (2006.01)
*H01R 31/06* (2006.01)
*H02M 1/42* (2007.01)
*H02M 7/04* (2006.01)

(52) U.S. Cl.
CPC .............. *H01R 31/06* (2013.01); *H02M 1/42* (2013.01); *H02M 7/04* (2013.01)

(56) References Cited

U.S. PATENT DOCUMENTS

| | | | |
|---|---|---|---|
| 6,582,833 B2 * | 6/2003 | Toyoda | B23K 35/0261 |
| | | | 219/146.22 |
| 7,161,085 B2 | 1/2007 | Sugimoto et al. | |
| 8,651,750 B2 | 2/2014 | Terlizzi et al. | |
| 9,388,975 B2 | 7/2016 | Wenger | |
| 9,461,417 B2 | 10/2016 | Zhang | |
| 9,589,702 B2 * | 3/2017 | Horii | H01B 7/0823 |
| 10,019,051 B2 | 7/2018 | Yang | |
| 2004/0010649 A1 * | 1/2004 | Weaver | H02J 9/00 |
| | | | 710/302 |
| 2007/0300155 A1 | 12/2007 | Laefer et al. | |
| 2010/0321591 A1 * | 12/2010 | Onomatsu | H01B 7/0823 |
| | | | 348/737 |
| 2015/0170793 A1 | 6/2015 | Horii et al. | |
| 2017/0010661 A1 | 1/2017 | Yang | |

FOREIGN PATENT DOCUMENTS

| | | |
|---|---|---|
| CN | 204303404 U | 4/2015 |
| CN | 105531887 A | 4/2016 |
| EP | 2264717 A2 | 12/2010 |
| EP | 2871643 A1 | 5/2015 |
| JP | 2001-312923 A | 11/2001 |
| JP | 2004-079482 A | 3/2004 |
| JP | 2011-129467 A | 6/2011 |
| JP | 2014-006996 A | 1/2014 |
| KR | 10-2006-0049247 A | 5/2006 |
| KR | 10-0979599 B1 | 9/2010 |
| KR | 10-1329780 B1 | 11/2013 |
| KR | 10-2013-0134893 A | 12/2013 |
| KR | 10-1491227 B1 | 2/2015 |
| KR | 10-2015-0111804 A | 10/2015 |
| KR | 10-2016-0104502 A | 9/2016 |
| WO | 2007020542 A2 | 2/2007 |

OTHER PUBLICATIONS

Written Opinion (PCT/ISA/237) issued by the International Searching Authority in corresponding International Application No. PCT/KR2017/002488, dated Sep. 29, 2017.
International Search Report (PCT/ISA/210), issued by International Searching Authority in corresponding International Application No. PCT/KR2017/002488, dated Sep. 29, 2017.
Communication dated Apr. 17, 2020 issued by the State Intellectual Property Office of P.R. China in counterpart Chinese Application No. 201780084315.0.
Communication dated Jun. 19, 2020 issued by the Indian Patent Office in Indian counterpart Application No. 201917029139.

* cited by examiner

POWER CABLE AND POWER ADAPTOR INCLUDING SAME

TECHNICAL FIELD

The disclosure relates to a power cable and a power adaptor including the same, and more particularly, to a power cable that is invisible with the naked eyes and a power adaptor including the same.

BACKGROUND ART

In general, a power cable is manufactured in a structure in which a thick insulating outer coating of black or a noticeable primary color is wrapped therearound. The power cable is connected to an electronic device (for example, a television, or the like) to apply power for driving the electronic device. The power cable having such an appearance is easily visible with the naked eyes, and is thus exposed to the outside of the electronic device when the power cable is connected to the electronic device. The power cable may not match the electronic device, resulting in deteriorating the overall appearance of the electronic device, not matching a space where the electronic device is installed, or reducing interior decoration effects.

Various electronic devices meeting various needs of users have been implemented. As an example, a power supply device has changed from a built-in device to an external power adaptor, which makes it possible to reflect the design requirements for electronic devices such as miniaturization and slimness of the electronic devices.

Meanwhile, the design of the electronic device has been improved, while a power cable or a DC cable of a power adaptor connected to the electronic device still has a black or primary color appearance. The power cable according to the related art is connected to the electronic device having the improved design, such that an improved design quality of the electronic device is reduced by a shape of the power cable.

In addition, the electronic device may be a television (TV) displaying images on a screen. In this case, a power cable of a black color is connected to a back surface of the TV and is exposed to interfere with an image reproduced from the TV, resulting in a decrease in the concentration of a viewer.

DISCLOSURE

Technical Problem

To solve the above-mentioned problems, the disclosure provides a power cable that is manufactured to be invisible to the naked eyes of a user and a power adapter including the same.

Technical Solution

According to an embodiment of the disclosure, a power adaptor includes: an adaptor body; and a cable connected to the adaptor body, in which the cable includes a plurality of conducting wires, which are arranged in parallel and arranged to be spaced apart from one another, and an outer coating surrounding the plurality of conducting wires and formed of a transparent material and.

The outer coating may be formed in a flat shape.

An interval between the plurality of conducting wires may be formed to be greater than a diameter of the conducting wire.

Each of the plurality of conducting wires may be plated with a material having a metallic gloss. The cable may further include a plurality of inner coatings surrounding the plurality of conducting wires, respectively, and formed of a transparent material.

In each of the plurality of conducting wires, transparent electrodes may be repeatedly stacked.

The adaptor body may include: an alternating current (AC)/direct current (DC) converter configured to convert an input AC voltage to a DC voltage; a main voltage supplier configured to convert the DC voltage to a main voltage; a standby voltage supplier configured to convert the DC voltage to a standby voltage; and a switching unit configured to transmit the DC voltage to one of the main voltage supplier and the standby voltage supplier according to a mode selection signal applied from an electronic device to which the cable is connected.

The plurality of conducting wires may include a main power line connected to the main voltage supplier, a standby power line connected to the standby voltage supplier, a signal line connected to the switching unit, and a ground line, and the main power line and the ground line may be disposed between the standby power line and the signal line.

The plurality of conducting wires may include a plurality of the main power lines and a plurality of the ground lines.

The standby power line and the signal line may be disposed at outer portions of the cable.

The power adaptor may further include a pin terminal portion in which a plurality of pins connected to the cable are arranged in a row and protrudes outward, and a connector including a socket portion in which pin receiving holes receiving the plurality of pins are formed, and lengths of a pin connected to the standby power line and a pin connected to the signal line may be shorter than lengths of a pin connected to the main power line and a pin connected to the ground line.

According to another embodiment of the disclosure, a power cable includes: a plurality of conducting wires which are arranged in parallel and arranged to be spaced apart from one another; and an outer coating surrounding the plurality of conducting wires and formed of a transparent material, in which the outer coating is flat, and formed to transmit external light.

The plurality of conducting wires may have a circular cross-section, and may be spaced apart from one another by an interval larger than a diameter of the conducting wire.

In each of the plurality of conducting wires, a plurality of transparent electrodes may be stacked.

The transparent electrode may be formed in a thin-film shape.

BEST MODE

Hereinafter, with reference to accompanying drawings, embodiments of a power cable and a power adaptor including the same according to the disclosure will be described in detail.

Embodiments to be described below are merely exemplary to facilitate understanding of the disclosure, and it is to be understood that the disclosure may be embodied with various modifications other than embodiments to be described herein. However, in the following description, when determination is made that a detailed description of a well-known function or component of the related art may unnecessarily obscure the gist of the disclosure, the detailed description and specific illustrations thereof will be omitted. In addition, to facilitate understanding of the disclosure, components in the accompanying drawings are not necessarily drawn to scale, and sizes and dimensions of some components may be exaggerated.

In the disclosure, "transparent" means that all or part of light passes through, and therefore "translucent" is included in the meaning of "transparent".

A power adaptor and a power cable according to an embodiment of the disclosure may be applied to various electronic devices. However, for convenience of description, in the embodiment, a case in which the power adaptor and the power cable are applied to a television (TV) will be exemplified.

Hereinafter, a power adaptor 10 according to an embodiment of the disclosure will be described, and then a power cable 100 included in the power adaptor 10 will be described in detail.

Figure 1:
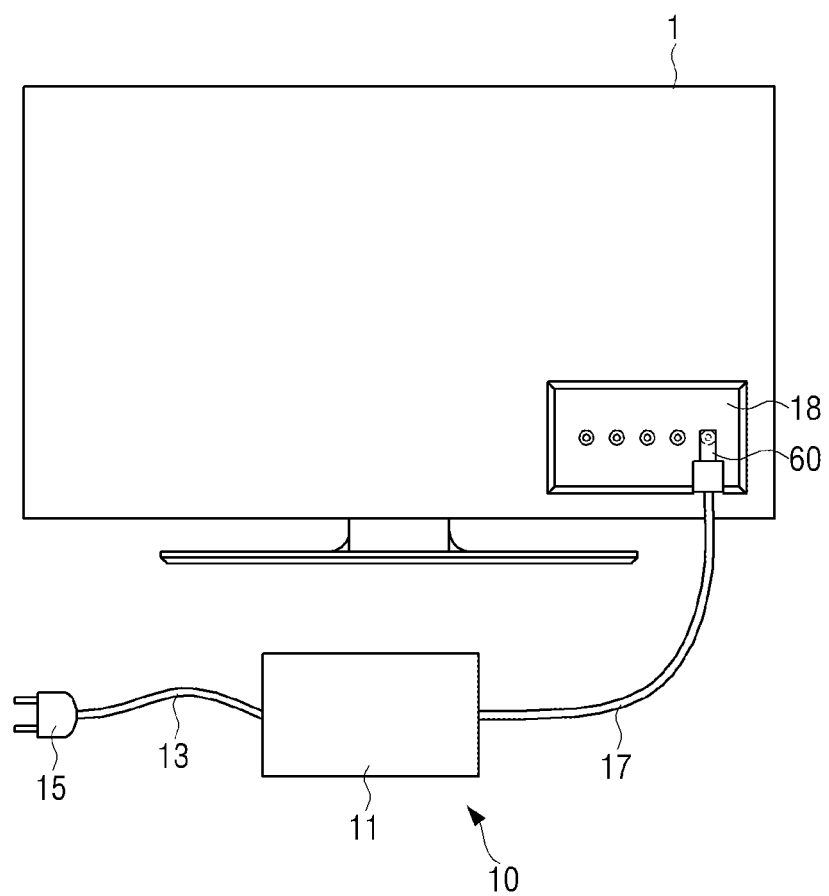
FIG. 1 is a view showing that a power adaptor according to an embodiment of the disclosure is connected to a display.

FIG. 1 is a view showing that the power adaptor according to the embodiment of the disclosure is connected to a display.

In the embodiment, to meet user's various needs, the built-in power supply device (not shown) in a TV 1 is being changed to an external power adaptor 10, which makes it possible for the TV 1 to be smaller or slimmer.

The power cable 100 according to the embodiment of the disclosure, which allows light to be transmitted therethrough, is invisible with the eyes of the user. Therefore, when the power cable 100 is connected to a connecting portion 18 formed on the back surface of the TV 1, the power cable may be invisible to the eyes of the user.

A DC cable 17 of the power adaptor 10 according to the embodiment of the disclosure, which is connected to the TV 1, may be formed to be transparent such that the cable is not easily identified with the naked eyes of the user. Even when the power adaptor 10 is connected to the connecting portion 18 of the back surface of the TV 1, the DC cable 17 is formed to be transparent, such that the overall design effect of the TV 1, which has been deteriorated by the DC cable 17, may not be deteriorated.

Referring to FIG. 1, the power adaptor 10 connected to the TV 1 receives an AC voltage through an AC cable 13 to convert the AC voltage into a DC voltage, and outputs the converted DC voltage to the DC cable 17 to thereby supply power to the TV 1.

One end of the AC cable 13 is connected to an adaptor body 11, and the other end of the AC cable 13 is connected to an AC plug 15. The AC plug 15 is connected to a general electric outlet, to which rated power is supplied, to receive power. The adaptor body 11 includes a power supply circuit 12 (see FIG. 2) that performs AC/DC conversion on the power inputted through the AC cable 13, and outputs the DC power.

One end of the DC cable 17 is connected to the adaptor body 11, and the other end of the DC cable 17 is connected to a connector 60. The connector 60 may have a shape suitable for the DC power input of the TV 1. The DC cable 17 outputs DC power from the adaptor body 11 and supplies power to the TV 1.

When the power adaptor 10 is connected to the TV 1, the DC cable 17 is formed of a material capable of transmitting light, such that the DC cable 17 may be seen as being generally transparent. Therefore, the part of the DC cable 17, which is out of the outline of the TV 1 to be exposed to the view of the user when the DC cable 17 is connected to the TV 1, is invisible, which makes it possible to prevent the design of the TV 1 from being deteriorated. Here, the adaptor body 11 may be disposed to be hidden in the periphery where the TV 1 is installed.

The AC cable 13 and the DC cable 17 may be formed integrally with the adaptor body 11, or may be detachably connected from the adaptor body 11.

Figure 2:
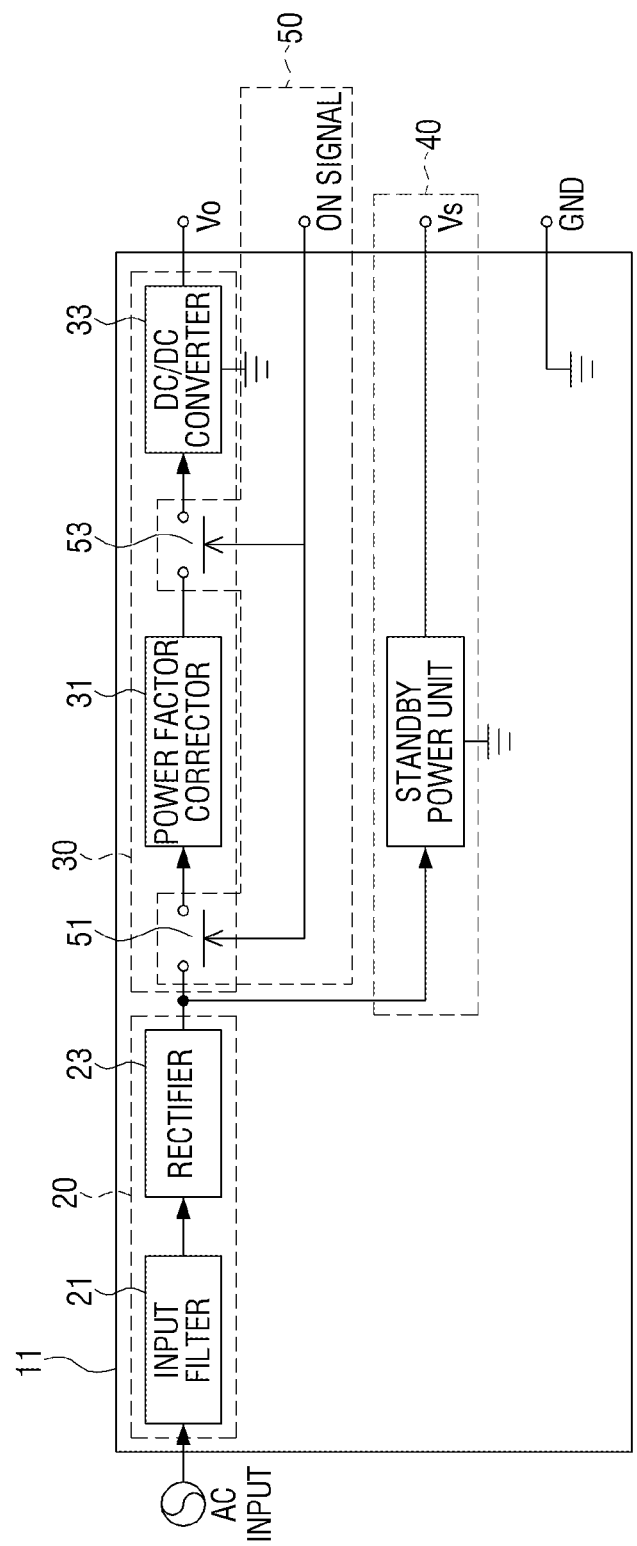
FIG. 2 is a view schematically showing a power supply circuit of the power adaptor according to the embodiment of the disclosure.

FIG. 2 is a view schematically showing a power supply circuit of the power adaptor according to the embodiment of the disclosure.

Referring to FIG. 2, the adaptor body 11 includes a power supply circuit 12 formed therein and outputting DC power using AC power.

Meanwhile, the power adaptor 10 is required to have a large-capacity specification to supply power to the large-sized TV 1 consuming a large-capacity power. However, when the power adaptor 10 is implemented to have a large-capacity specification, the output current becomes too large such that the DC cable may become thick, and heat is generated at the contact point of the connector such that problems may occur in safety.

To solve the problems, in the power adaptor 10, the power supply circuit 12 decreases the output current and increases the output voltage Vo to supply a large-capacity power, unlike an existing adaptor. As the output current of the power adaptor 10 is lowered, the thickness of the DC cable 17 may be made thinner and the heat generated at the connector 60 of the DC cable may be reduced.

The power supply circuit 12 is roughly divided into an AC/DC converter 20, a main voltage supplier 30, and a standby voltage supplier 40, and a switching unit 50.

The AC/DC converter 20 may include an input filter 21 and a rectifier 23. The input filter 21 may be connected to an AC input power supply. The input filter 21 serves to attenuate the high frequency noise generated outside and the high frequency noise generated inside. The rectifier 23 is connected to the input filter 21 and rectifies the AC power that has passed through the input filter 21 to DC power.

The main voltage supplier 30 includes a power factor corrector 31 and a DC/DC converter 33, and may include a first switch 51 and a second switch 53 of the switching unit 50, which will be described later, to minimize waste of power consumption. The power factor corrector 31 supplies the power factor correction voltage obtained by boosting voltage stably to the DC/DC converter 33. The DC/DC converter 33 may output a plurality of DC voltages Vo required by the TV 1.

The main voltage supplier 30 supplies various voltages Vo required to drive the TV 1. The output voltage Vo of the main voltage supplier 30 includes a high voltage for driving the TV 1.

The main voltage supplier 30 inputs the main voltage Vo output from the main voltage supplier 30 to the TV 1 only when an operation mode signal is applied thereto. The operation mode signal means a control signal or an operation signal for controlling the circuit operation of the main voltage supplier 30.

The standby voltage supplier 40 is connected to the AC/DC converter to output the standby voltage Vs. The standby voltage supplier 40 always supplies a standby voltage Vs to the TV 1 in a state in which an AC power supply is connected thereto. The standby voltage supplier 40 supplies power to the TV 1 even when the main voltage supplier 30 does not operate, that is, in a standby mode.

When the TV 1 is in the standby mode, the power adaptor 10 always input the standby voltage Vs to the TV 1 to allow a remote control sensor (not shown) for sensing signals from a remote control in the TV 1 and a controller (not shown) to always operate. For example, the standby voltage Vo has a relatively low value as compared to the main voltage Vo, such as 5V or 12 V.

The switching unit 50 transmits a signal of the remote control from the TV 1 to the power adaptor 10, in the standby mode of the TV 1.

The switching unit 50 operates according to a mode selection signal applied from the TV 1. When the operation mode signal is applied from the TV 1, the switching unit 50 turns on the first and second switches 51 and 53 to supply the main voltage Vs from the main voltage supplier 30 to the TV 1. When the standby mode signal is applied from the TV 1, the switching unit 50 turns off the first and second switches 51 and 53 to supply the standby voltage Vs from the standby voltage supplier 40 to the TV 1, instead of supplying the main voltage Vo from the main voltage supplier 30 to the TV 1.

In FIG. 2 the main voltage supplier 30 is shown as being operated by the first and second switches 51 and 53, however the main voltage supplier 30 is not limited thereto. For example, the circuit in the main voltage supplier 30 may also be controlled by a signal. To supply a large-capacity power, the power adaptor 10 outputs the main voltage Vo which is relatively higher than the standby voltage Vs, but the main voltage supplier 30 is operated only when the main voltage supplier 30 receives a separate operation mode signal by the switching unit 50. That is, when the operation mode signal is not separately applied from the TV 1, the power factor corrector 31 and the DC/DC converter 33 of the main voltage supplier 30 do not operate and the main voltage Vo is not output, such that problems in safety may be solved.

Unlike the main voltage Vo, the standby voltage Vs is not influenced by the mode selection signal, and is always output from the power adaptor 10. The standby voltage Vs has a relatively lower value than the main voltage Vo and is supplied to a standby circuit of the TV 1. Here, when the user operates the TV 1 using the remote control or the like, the operation signal is transmitted from the standby circuit to the power adaptor 10 through the switching unit 50. The power adaptor 10 outputs the main voltage Vo according to the operation signal.

In FIG. 2, the standby voltage supplier 40 is connected between the rectifier 23 and the power factor corrector 31, but it may be connected to any position as long as the standby voltage Vs is always able to be output regardless of the mode selection signal.

Figure 3A:
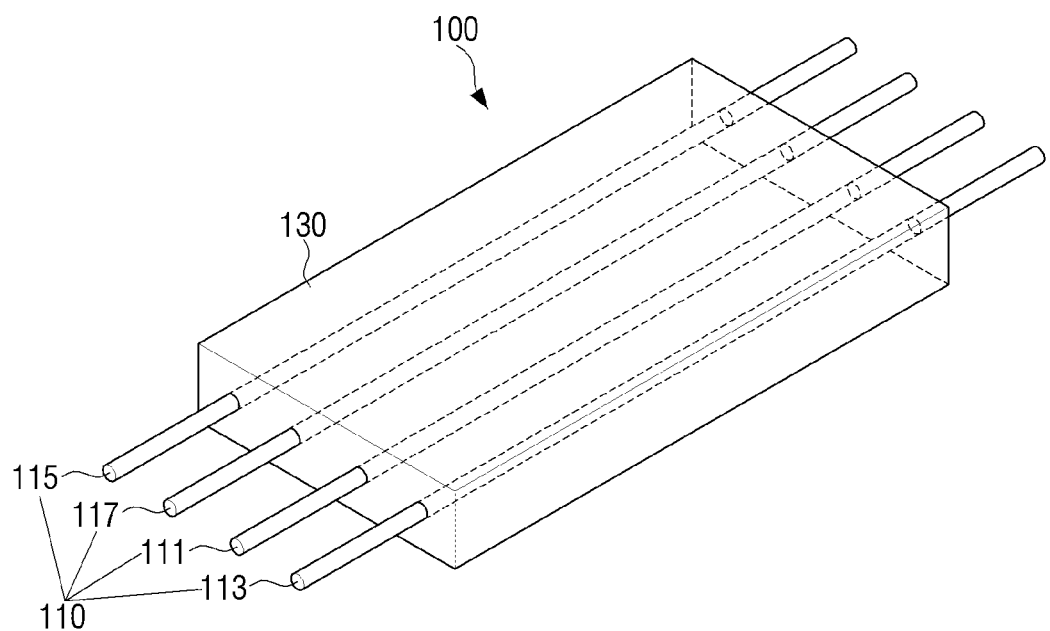
FIG. 3A is a perspective view showing an interior of the power cable according to the embodiment of the disclosure.
Figure 3B:
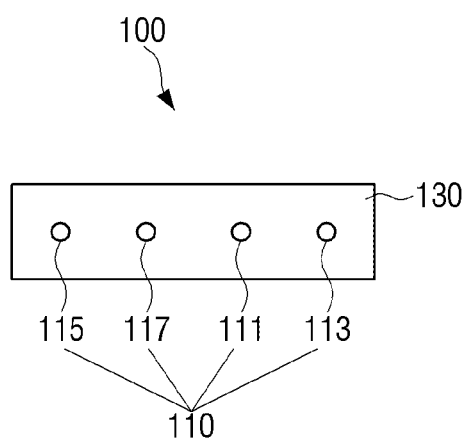
FIG. 3B is a cross-sectional view taken along line A-A shown in FIG. 3A.

FIG. 3A is a perspective view showing an interior of a power cable according to the embodiment of the disclosure, and FIG. 3B is a cross-sectional view taken along line A-A shown in FIG. 3A.

When the DC cable 17 connected to the adaptor body 11 is connected to the TV 1, the DC cable protrudes from the TV 1 to the outside. In this case, to ensure aesthetic appearance and electrical safety, the DC cable 17 is protruded to be longer to allow the adaptor body 11 and the AC cable 13 to be hidden by surrounding furniture. However, the DC cable is still exposed to the outside of the TV 1. In this case, as described above, the DC cable 17 may be manufactured to be transparent to lower the visibility of the DC cable 17.

Hereinafter, a configuration of a power cable 100 used as the DC cable 17 will be described in detail. Referring to FIGS. 3A and 3B, the power cable 100 according to the embodiment of the disclosure may include a plurality of conducting wires 110 and an outer coating 130 surrounding the plurality of conducting wires 110 and formed of a transparent material.

Transparency is a ratio of the degree to which an object transmits light. Here, the transparency of the power cable 100 does not indicate the degree of light passing through any one point of the power cable 100, but means a ratio of an area through which light passes with respect to unit area of the power cable 100. Accordingly, it means that the higher the transparency of the power cable 100, the less the power cable 100 is recognized by the user.

The plurality of conducting wires 110 may be formed of sufficiently thin metal wires. The transparency of the power cable 100 may be influenced by the area of the surface occupied by the conducting wires 110 per unit area. To lower the visibility of the power cable 100, the plurality of conducting wires 110 have an outer diameter d minimized, and are arranged at an interval p between the plurality of conducting wires 110.

The plurality of conducting wires 110 may be formed thinner than the wires used in the power cable according to the related art. Since the current of the power output from the power adaptor 10 is small, the DC cable 17 may smoothly supply power to the TV 1 even though the DC cable 17 has the conducting wire 110 having a small thickness.

The plurality of conducting wires 110 are arranged to be spaced apart from one another such that the sufficient interval p between the conducting wires 110 may be ensured. In this case, the interval p formed by the conducting wires 110 may be formed to be larger than the outer diameter d of the conducting wire 110. Specifically, the conducting wires 110 may be arranged such that the interval between the conducting wires 110 is at least five times or more greater than the diameter d of the conducting wire 110. The interval between the conducting wires 110 is sufficiently widen, such that the transparency of the power supply cable 100 can be ensured. In this way, as the light transmitting area of the power cable 100 is increased, the visibility of the power cable 100 can be lowered.

In addition, the plurality of conducting wires 110 may be arranged parallel to each other. The plurality of conducting wires 110 are neither arranged vertically, nor arranged to form a layer. The reason is that the ratio of the area of the surface occupied by the conducting wires 110 with respect to unit area of the power cable 100 may be increased when the plurality of conducting wires 110 are arranged on different planes, instead of being arranged parallel to each other. Therefore, the plurality of conducting wires 110 are arranged on the same plane.

The plurality of conducting wires 110 are formed of a conductive material such as copper or aluminum. The plurality of conducting wires 110 may be formed of a colored metal such as copper. In this case, the plurality of conducting wires 110 may be plated or coated with a material having a metallic gloss such that each of the plurality of conducting wires 110 appear achromatic. Specifically, the plurality of conducting wires 110 may be coated or plated with an achromatic metal such as nickel, tin, silver, and the like. Accordingly, the visibility of the plurality of conducting wires 110 may be lowered.

The outer coating 130 may include an insulating layer surrounding the outer surfaces of the plurality of conducting wires 110. The outer coating 130 is formed of a transparent material such that light is transmitted through the power cable 100. The outer coating 130 covers the entirety of the plurality of conducting wires 110. The outer coating 130 may hold a state in which the plurality of conducting wires 110 are arranged to be spaced apart from one another at a predetermined interval on the same plane.

The outer coating 130 transmits external light. Specifically, the outer coating 130 transmits light that is reflected from the bottom surface or the periphery where the power cable 100 is disposed and is incident on the outer coating 130. As the outer coating 130 is formed of a transparent material, the power cable 100 is invisible to the eyes of the user. Since the user recognizes the background or periphery seen through the outer coating 130 of the power cable 100 depending on the view of the user, the power cable 100 itself may not be visible with the naked eyes of the user.

The outer coating 130 may be formed in a flat shape, such that the power cable 100 itself may be formed in a flat shape. One surface and a rear surface of the surface of the outer coating 130 are formed parallel to each other. The facing surfaces of the surface of the outer coating are parallel to each other, and each surface is formed to be flat. As the surface of the outer coating is formed to be flat, refraction that distorts the path of light can be minimized.

As described above, the power cable 100 according to the disclosure is formed by arranging a plurality of conducting wires 110 to be spaced apart from one another at a predetermined interval and surrounding the conducting wires 110 with the outer coating 130 formed of a transparent material. In this way, external light is transmitted though the outer coating 130, and is transmitted through the intervals formed by the plurality of conducting wires 110. Accordingly, the power cable 100 according to the embodiment of the disclosure is formed to transmit light, such that the power cable 100 invisible to the eyes of the user may be provided.

The plurality of conducting wires 110 connected to the adaptor body 11 may include a main power line 111, a standby power line 113, a signal line 115 and a ground line 117. Each of output terminals (Vo, On signal, Vs, GND) of the adaptor body 11 is connected to one conducting wire 110.

The main power line 111 is connected to the output terminal of the main voltage supplier 30 and the standby power line 113 is connected to the output terminal of the standby voltage supplier 40. The main power line 111 supplies the main power to the TV 1, and the standby power line 113 supplies the standby power to the TV 1.

The signal line 115 is connected to the input terminal of the switching unit 50, and the ground line 117 is connected to a ground unit. The signal line 115 receives a mode selection signal from the TV 1 and transmits the signal to the adaptor body 11. The main voltage supplier 30 is driven according to the signal applied from the signal line 115.

The signal line 115, the main power line 111, the ground line 117, and the standby power line 113 are arranged in parallel to each other. The signal line 115, the main power line 111, the ground line 117, and the standby power line 113 are arranged in parallel on the same plane. Accordingly, the power cable 100 may have the increased area through which light is transmitted and increased transparency.

The standby power line 113 and the signal line 115 may be disposed at the outer portions of the power cable 100. The standby power line 113 and the signal line 115 may be disposed at both ends of the transparent power cable 100. That is, the signal line 115, the main power line 111, the ground line 117, and the standby power line 113 may be sequentially arranged on the same plane.

When the power cable 100 is cut by scissors or the like during operation of the power adaptor 10, the standby power line 113 and the signal line 115 disposed at the outer portions thereof are first cut, such that the output of the main voltage Vo may be cut off. Accordingly, safety accidents caused by the main voltage Vo having a high voltage may be prevented.

Although FIG. 3A shows an example in which one output terminal of the adaptor body 11 is connected to one conducting wire 110 of the transparent power cable 100, the disclosure is not limited thereto, and the conducting wire 110 may be added as needed. Therefore, the power adaptor 10 may be formed such that a plurality of conducting wires are connected to one output terminal of the adaptor body 11. The power cable 100 may further include a plurality of the main power lines 111 and a plurality of the ground lines 117.

Figure 4A:
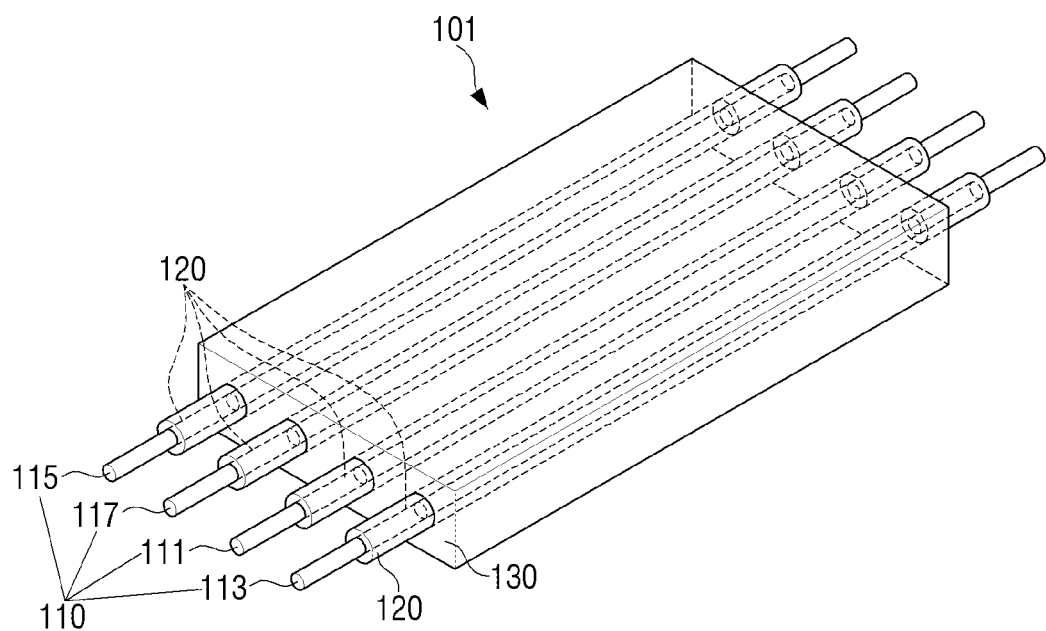
FIG. 4A is a perspective view showing a power cable according to another embodiment of the disclosure.
Figure 4B:
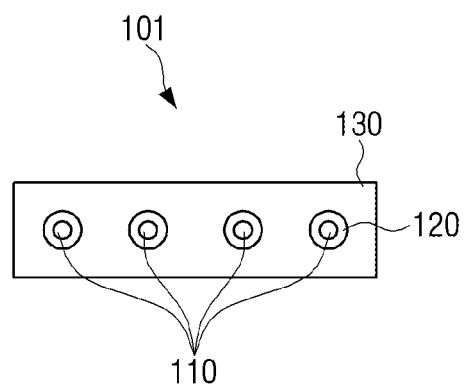
FIG. 4B is a cross-sectional view taken along line B-B shown in FIG. 4A.

FIG. 4A is a perspective view showing a power cable according to another embodiment of the disclosure, and FIG. 4B is a cross-sectional view taken along line B-B shown in FIG. 4A.

Referring to FIGS. 4A and 4B, the power cable 101 according to another embodiment of the disclosure further includes an inner coating 120 formed of a transparent material and surrounding each of a plurality of conducting wires 110, unlike the embodiment of FIGS. 3A and 3B.

The power cable 101 according to another embodiment of the disclosure is formed by covering the plurality of conducting wires 110 with the transparent inner coating 120, arranging the conducting wires 110 to be spaced apart from one another to ensure sufficient interval between the conducting wires 110, and then covering again the entire conducting wires 110 with an outer coating 130 formed of a transparent material.

Figure 5:
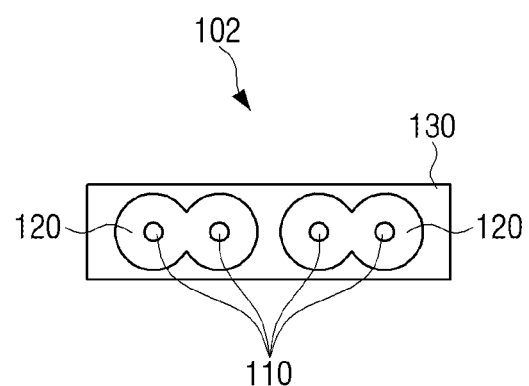
FIG. 5 and FIG. 6 are cross-sectional views showing a power cable according to still another embodiments of the disclosure.
Figure 6:
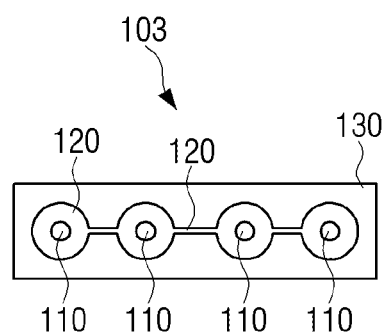

FIGS. 5 and 6 are sectional views showing a power cable according to still another embodiment of the disclosure.

Referring to FIGS. 5 and 6, the power cable 102 shown in FIGS. 5 and 6 may be formed such that a plurality of conducting wires 110 covered with the inner coating 120*a* are connected to each other, unlike the power cable 101 shown in FIGS. 3 and 4 in which a plurality of conducting wires 110 are separated from each other.

The power cable 102 according to the embodiment in FIG. 5 is formed such that all of the inner coatings 120*a* of the plurality of conducting wires 110 are connected to each other, and the power cable 103 according to the embodiment in FIG. 6 is formed such that some of the inner coatings 120*b* of the plurality of conducting wires 110 are connected to each other. Thus, productivity of the power cables 102 and 103 can be increased.

In the power cables 100, 101, 102, and 103 according to the various embodiments described above, the coatings 120 and 130 transmit external light, and the plurality of conducting wires 110 therein are arranged in parallel to be spaced apart from one another, such that the power cables 100, 101, 102, and 103 can be invisible to the eyes of the user.

When the power cable 100 formed of a transparent material is installed indoors, the transparent power cable 100 may transmit light at the periphery in which the power cable 100 is installed. Accordingly, the power cable 100 may be invisible to the eyes of the user and may not reduce the interior decoration effects of the space in which the power cable 100 is installed.

The power cable 100 formed to be transparent according to the embodiment of the disclosure may be applied to the AC cable 13 as well as the DC cable 17. In addition, the cable 100 according to the embodiment of the disclosure transmitting light therethrough may be applied to a power cord directly connecting the electronic device 1 to the general electric outlet as well as the cables 13 and 17 connected to the body 11 of the power adaptor 10.

Figure 7A:
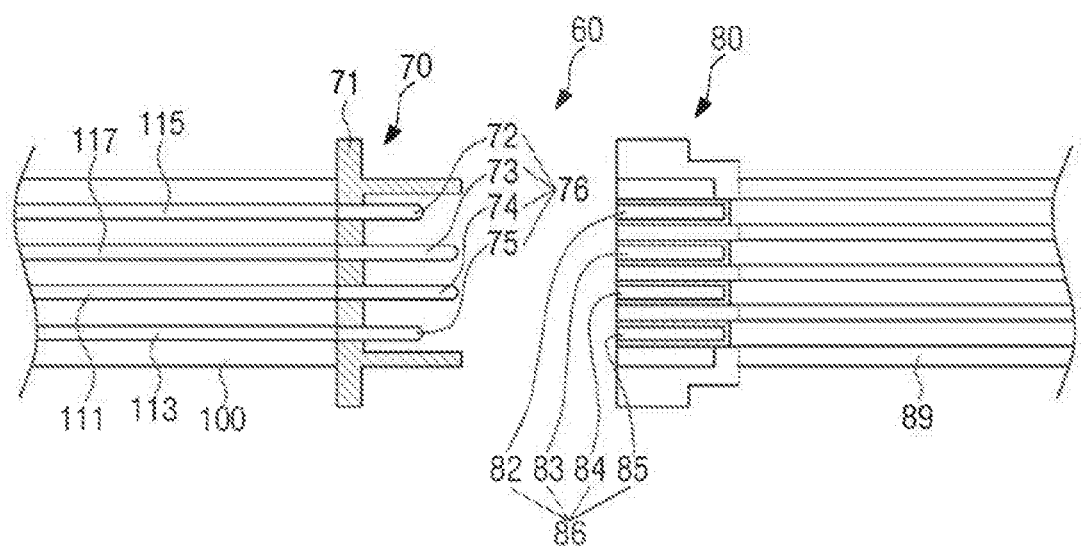
FIGS. 7A to 7C are views showing a process in which a connector of a power cable according to an embodiment of the disclosure is connected.
Figure 7B:
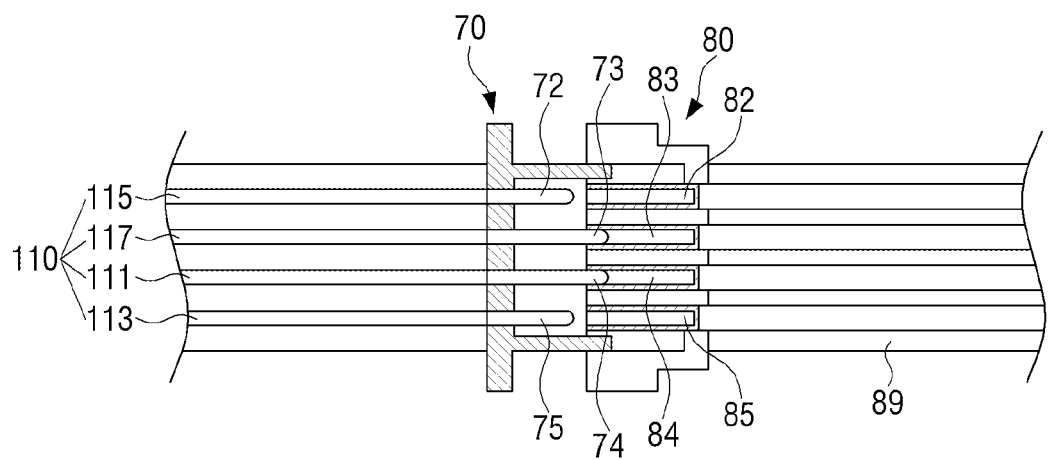
Figure 7C:
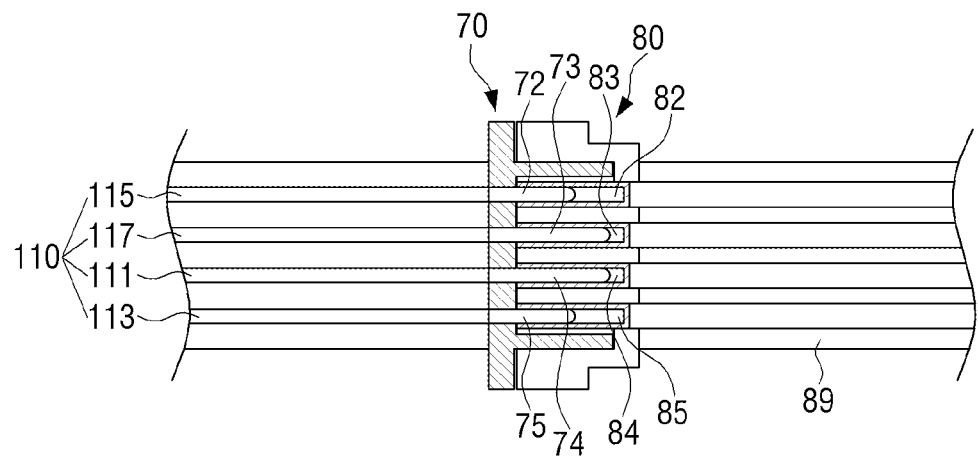

FIGS. 7A to 7C are views showing a process in which a connector of a power cable according to an embodiment of the disclosure is connected.

Referring to FIG. 7A, the DC cable 17 of the power adaptor 10 is connected to the electric device 1 by the connector 60.

The connector 60 includes a pin terminal portion 70 connected to the adaptor body 11 and a socket portion 80 connected to the TV 1.

The connector 60 includes the pin terminal portion 70 in which a plurality pins 76 are arranged in a row inside a body portion 71 to be disposed on one plane. Here, each of the pins 76 is connected to the DC cable 100 of the back surface of the TV by a connecting means in the body portion 71.

Specifically, a plurality of pins 72, 73, 74, 75, and 76 may include a main pin 74 connected to a main power line 111, a standby pin 75 connected to a standby power line 113, a signal pin 72 connected to a signal line 115, and a ground pin 73.

The connector 60 includes a recess portion 81 capable of receiving the pin terminal portion 70 and the socket portion 80 having pin receiving holes 86 into which the plurality of pins 76 are inserted. Here, the bottom surface portion of the pin receiving hole 86 is connected to a circuit or a cable in the TV 1. The inside of the pin receiving hole 86 of the socket portion 80 is covered with a conducting material, and the conducting material and the circuit in the TV 1 are connected to each other by a connecting means.

Here, lengths of the pin 75 connected to the standby power line 113 and the pin 72 connected to the signal line 115 may be shorter than the lengths of the pin 74 connected to the main power line 111 and the pin 73 connected to the ground line 117.

Referring to FIGS. 7A to 7C, the lengths of the main pin 74 and the ground pin 73 are relatively long, and the lengths of the standby pin 75 and the signal pin 72 are relatively short.

When the connector 60 is fastened, the main pin 74 and the ground pin 73 come into contact with the pin receiving holes 83 and 84 of the TV 1 before the standby pin 75 and the signal pin 72 come into contact therewith. When the connector 60 is separated, the standby pin 75 and the signal pin 72 are separated from the pin receiving holes 85 and 82 inside the electronic device before the main pin 74 and the ground pin 73 are separated therefrom.

When the signal pin 72 is connected first and then the main pin 75 is connected, the main voltage Vo is activated by the signal. Therefore, at the moment when the main pin 75 is connected, generation of heat such as a spark may be generated due to a high-voltage main power.

However, in the connector 60 of the cable 100 according to the embodiment of the disclosure, the main pin 75 is fastened before the main voltage Vo is activated, and the main pin 75 is separated after the main voltage Vo is deactivated. Accordingly, in the disclosure, safety problems such as a spark that may occur when the power adaptor 10 transmitting a high voltage is separated from the TV 1 can be solved.

Figure 8:
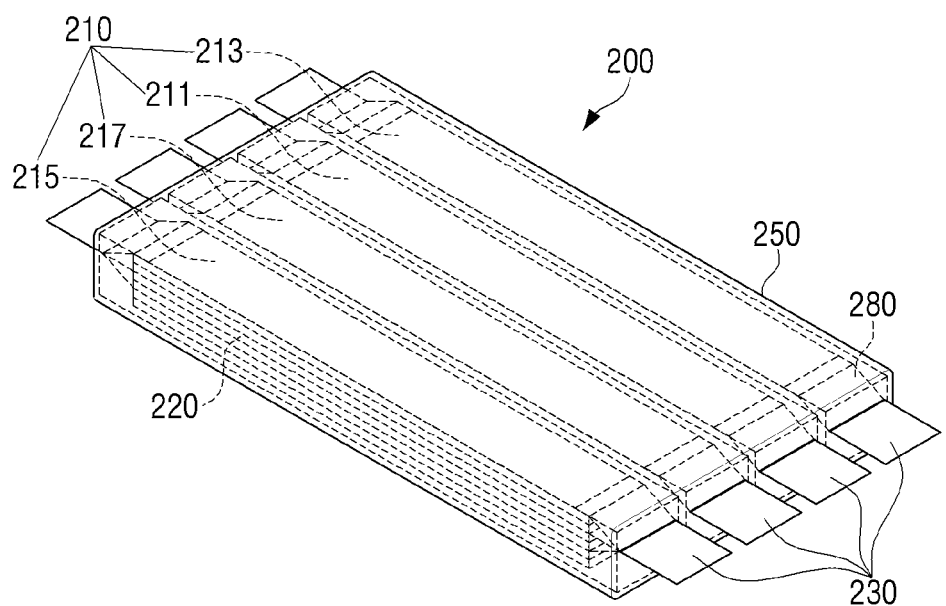
FIG. 8 is a perspective view showing a conducting wire of a power cable according to still another embodiment of the disclosure.

FIG. 8 is a perspective view showing a conducting wire of a power cable according to still another embodiment of the disclosure.

Referring to FIG. 8, a power cable 200 according to still another embodiment of the disclosure may include conducting wires 210, each formed by stacking a plurality of transparent electrodes, and an outer coating 250 surrounding the plurality of conducting wires.

The plurality of conducting wires 210 are each formed by repeatedly stacking the transparent electrode 220 to transmit light. The transparent electrode 220 may be formed in the form of a thin film having conductivity. Specifically, the transparent electrode 220 may be made of indium tin oxide (ITO), fluorine tine oxide (FTC)), metal mesh, polymer or the like. The plurality of conducting wires 210 may be arranged in parallel. The plurality of conducting wires 210 are not arranged vertically, and are not arranged to form a layer. The outer coating 250 is formed of a transparent material such that the power cable 200 transmits light. The outer coating 250 covers all the conducting wires 210 arranged in parallel.

Specifically, the plurality of conducting wires 210 may include a main power line 211, a standby power line 213, and a signal line 215 and a ground line 217. Here, the main power line 211 and the ground line 217 may be further included. In this case, the standby power line 213 and the signal line 215 may also be disposed at the outer portions of the power cable 200 to prevent a safety accident as in the embodiment of FIG. 3. The standby power line 213 and the signal line 215 may be disposed at the both ends of the transparent power cable 200. That is, the signal line 215, the main power line 211, the ground line 217, and the standby power line 213 may be sequentially arranged on the same plane.

The outer coating 250 may be formed in a flat shape, such that the power cable 200 may be formed in a flat shape. One surface and a rear surface of the surface of the outer coating 250 are formed parallel to each other. The facing surfaces of the surface of the outer coating are parallel to each other, and each surface is formed to be flat. As the surface of the outer coating is formed to be flat, refraction that distorts the path of light can be minimized.

A power cable 200 according to still another embodiment of the disclosure includes conducting wires 210 formed of a transparent material and an outer coating 250 formed of a transparent material and surrounding the transparent conducting wires 210. As the conducting wires 210 and the outer coating 250 are formed of transparent materials, the power cable 200 is formed entirely to be transparent.

Figure 9:
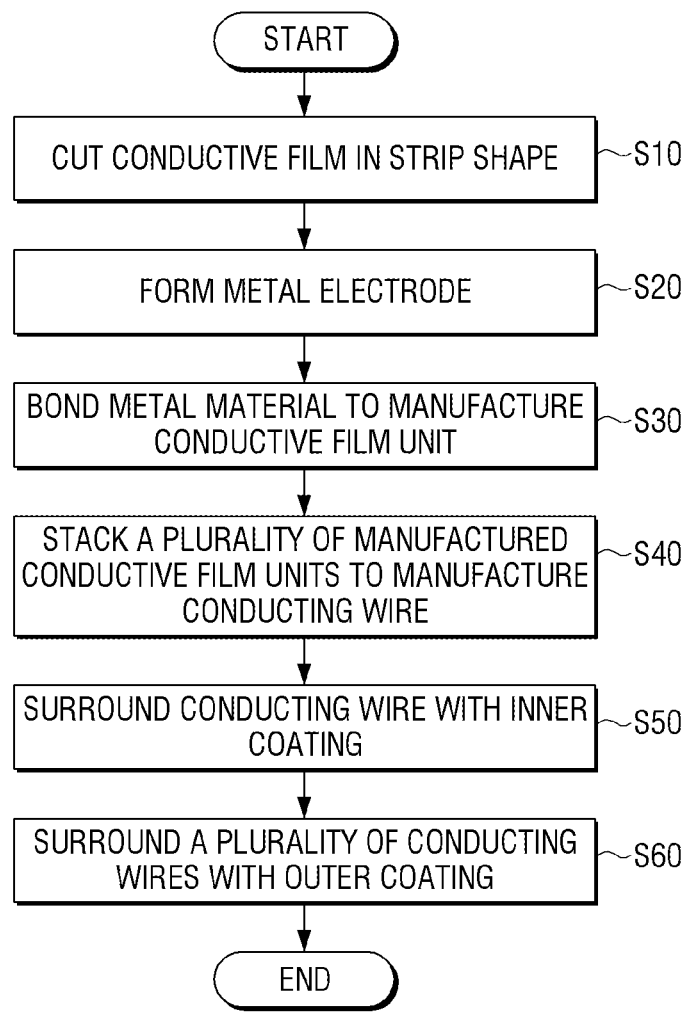
FIG. 9 is a flowchart showing a method of manufacturing a power cable according to still another embodiment of the disclosure.

FIG. 9 is a flowchart showing a method of manufacturing a power cable according to still another embodiment of the disclosure.

Referring to FIG. 9, a method of manufacturing a power cable 200 according to the embodiment will be described. A transparent electrode 220 is cut to form a strip shape (S10). Metal electrodes 225 (see FIG. 10B) are formed at both ends of the transparent electrode 220 (S20). A metal material 230 is bonded to the metal electrode 225 (S30). A transparent electrode unit 221 may be manufactured through steps S10 to S30. The manufactured transparent electrode units 221 are repeatedly stacked (S40). The stacked transparent electrode units 221, 222, and 223 are surrounded with an inner coating 240 (S50). A conducting wire 210 may be manufactured by surrounding the conducting wire electrode units 221, 222, and 223 with the inner coating 240. The manufactured plurality of conducting wires are arranged and surrounded with an outer coating 250 (S60). The power cable 200 may be manufactured through step S60.

FIGS. 10A to 10H are perspective views describing a method of manufacturing a power cable according to still another embodiment of the disclosure.

Figure 10A:
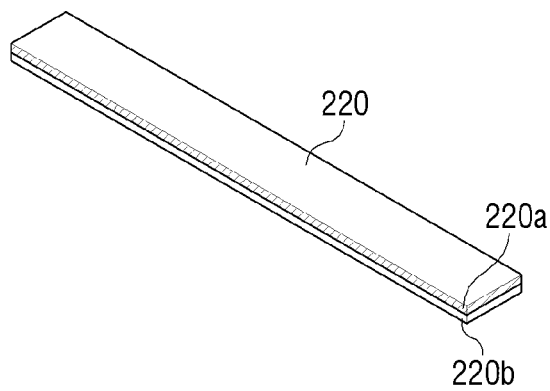
FIGS. 10A to 10H are perspective views describing a method of manufacturing a power cable according to still another embodiment of the disclosure.

Referring to FIG. 10A, a transparent electrode 220 is provided (S10). The transparent electrode 220 includes a transparent electrode 220a and a base film 220b. The transparent electrode 220 may be made of an ITO, an FTO, a metal mesh, a polymer or the like, depending on the type of the transparent electrode 220a applied onto the base film 220b. The transparent electrode 220 may be formed in a strip shape having a predetermined width.

Figure 10B:
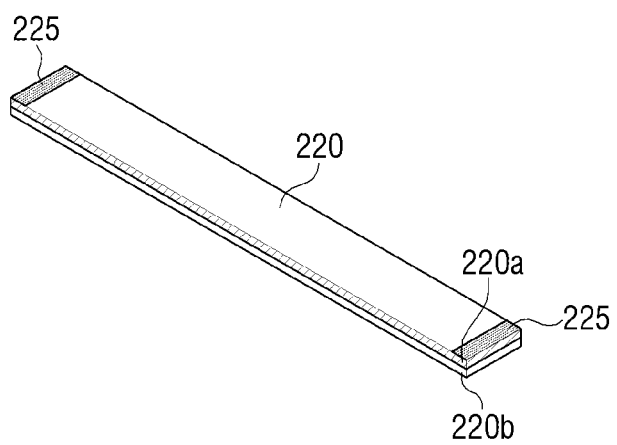

Referring to FIG. 10B, metal electrodes 225 may be formed at both ends of the transparent electrodes 220 formed in the strip shape (S20). The metal electrodes 225 may be formed by applying silver paste or depositing copper on the both ends of the transparent electrode 220. The metal electrodes 225 are formed to bond a metal material 230 to connect the transparent electrode 220 to an external circuit.

Figure 10C:
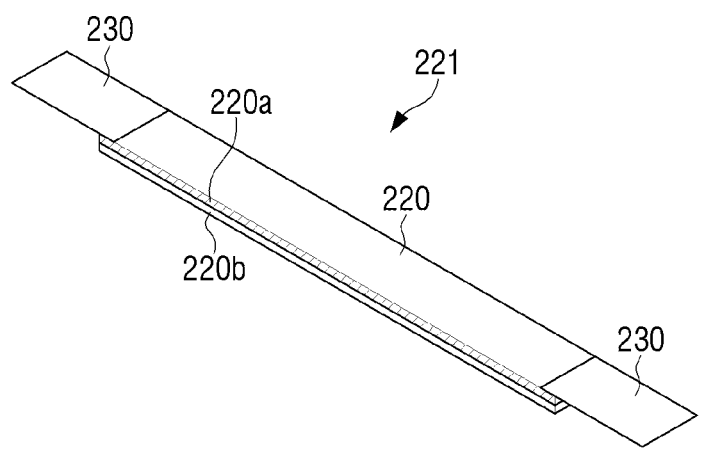

Referring to FIG. 10C, a metal material 230 having conductivity may be bonded to the metal electrode 225 (S30). The metal material according to the embodiment of the disclosure may be the metal material 230 having conductivity at both sides thereof such as a copper foil and having a film shape. The metal material 230 is provided to allow the transparent electrode 220 to be easily electrically connected to the external circuit.

The width of the metal material 230 may be formed to be the same with that of the transparent electrode 220. However, the disclosure is not limited thereto, and the width of the meal material 230 may be different from that of the transparent electrode 220.

In addition, although the metal material 230 is described as being connected to the metal electrode 225 shown in FIG. 10B, the disclosure is not limited thereto. The metal electrode 225 may be omitted, if the metal material 230 is bonded to the both ends of the transparent electrode 220 while securing low contact resistance.

A transparent electrode unit 221 may be manufactured through step S30.

Figure 10D:
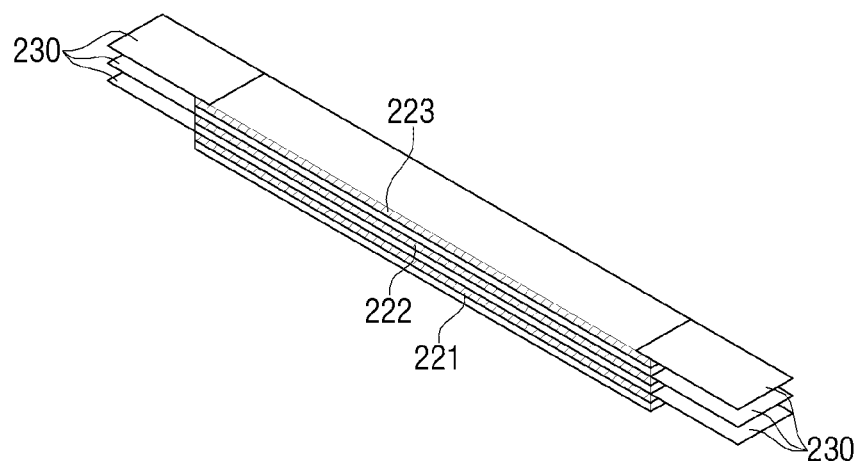

Referring to FIG. 10D, a plurality of transparent electrode units 221, 222, and 223, which are each manufactured with the transparent electrodes 220 having metal materials 230 bonded to both ends thereof may be stacked (S40). The transparent electrode 220 formed of the transparent electrode material has a problem of low conductivity compared to the metal material such as copper. To solve the problem, a plurality of transparent electrode units 221, 222, and 223 may be stacked to increase conductivity. The conducting wire 210 may be manufactured by stacking the plurality of transparent electrode units 221, 222, and 223.

Figure 10E:
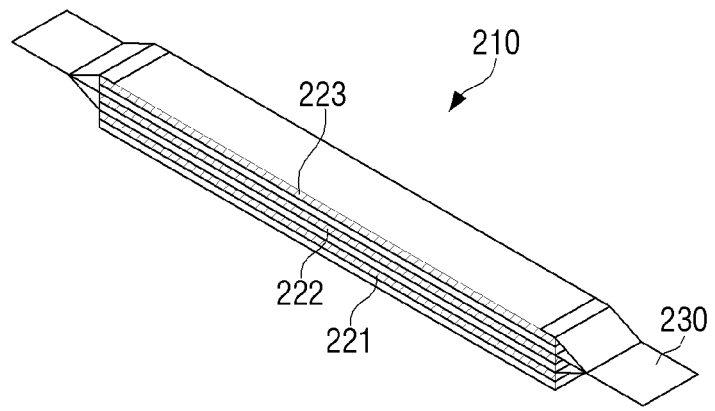

Referring to FIG. 10E, the metal materials 230 formed at both ends of the stacked transparent electrode units 221, 222, and 223 as shown in FIG. 10D may be bundled and short-circuited. The short-circuit may be performed by various methods, such as soldering, welding, and pressing, etc.

Figure 10F:
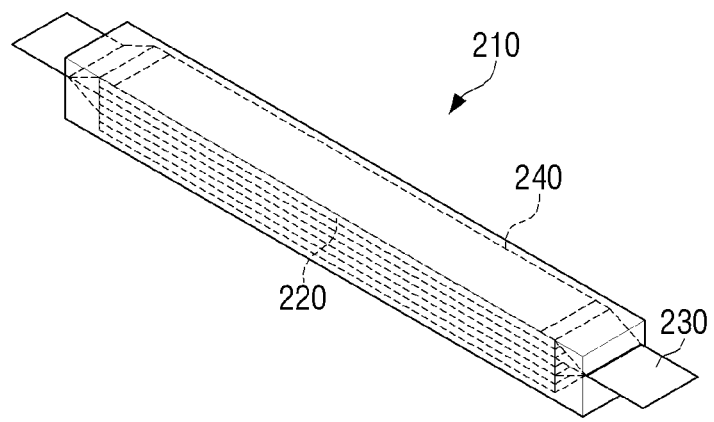

Referring to FIG. 10F, a conducting wire 210 may be formed by exposing only a part of the metal material 230 formed at both ends of the transparent electrodes 220 and electrically short-circuited as shown in FIG. 10D and entirely surrounding the stacked transparent electrode units 221, 222, and 223 with an inner coating 240. (S50).

The inner coating 240 may be formed of an insulating coating. In addition, the inner coating 240 is formed of a transparent material. Accordingly, the power cable 200 including a plurality of conducting wires 210 may be formed to be transparent.

The inner coating 240 may be formed in a flat shape, such that the transparent electrode units 221, 222, and 223 are formed in a flat shape. One surface and a rear surface of the surface of the inner coating 240 are formed parallel to each other. The facing surfaces of the surface of the inner coating 240 are parallel to each other, and respective surfaces are formed to be flat. As the surface of the outer coating 250 is formed to be flat, refraction that distorts the path of light can be minimized. Therefore, the transparent conducting wire 210 that transmits light may be formed.

Figure 10G:
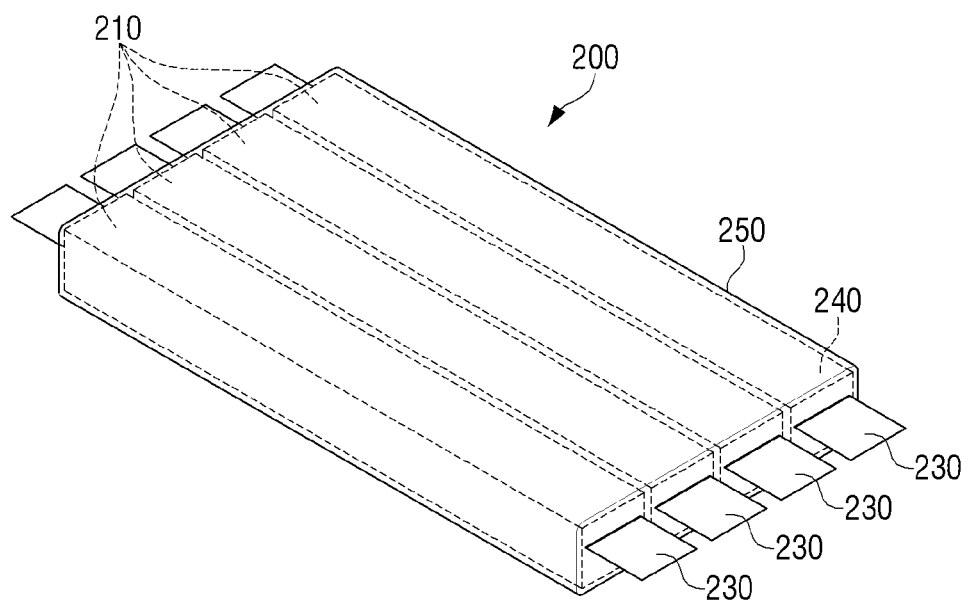

Referring to FIG. 10G, the power cable 200 is formed by arranging the plurality of transparent conducting wires 210 of FIG. 10F and surrounding again the transparent conducting wires 210 with an outer coating 250 (S60). The outer coating 250 may be formed of an insulating coating and formed of a transparent material. Accordingly, the power cable 200 may be formed to be entirely transparent. The outer coating 250 may be formed in a flat shape like the inner coating 240 described above, such that the power cable 200 may be formed entirely in a flat shape due to the outer coating 250.

Figure 10H:
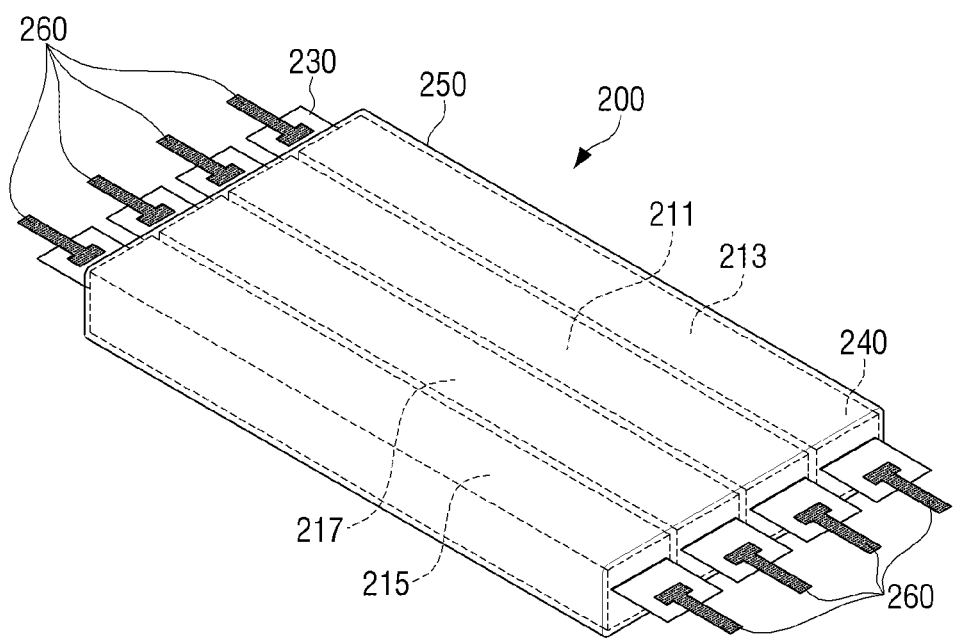

Referring to FIG. 10H, pins 260 for connection to the TV 1 may be boned to the power cable 200 shown in FIG. 10G. The pins 260 are bonded to the exposed metal materials 230 of the power cable 200. The pins 260 may be bonded using methods, such as soldering, welding, or pressing.

For user's safe and easy handling, a case may be covered in the pins 260 or a connector may be injected therefrom.

Figure 11A:
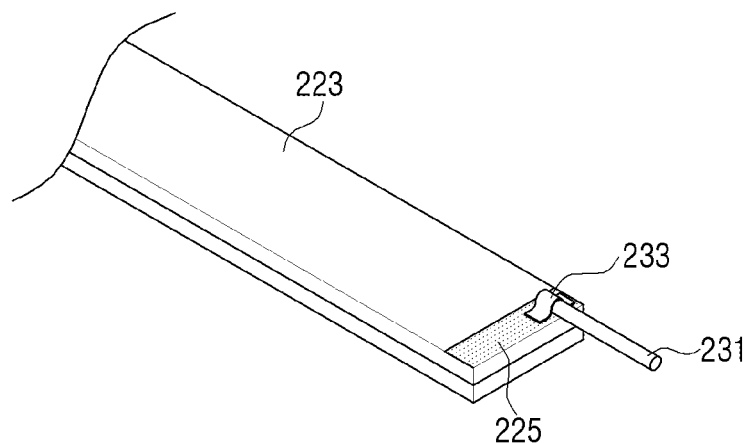
FIGS. 11A to 11C are perspective views describing a method of manufacturing a conducting wire of a power cable according to still another embodiment of the disclosure.
Figure 11A:
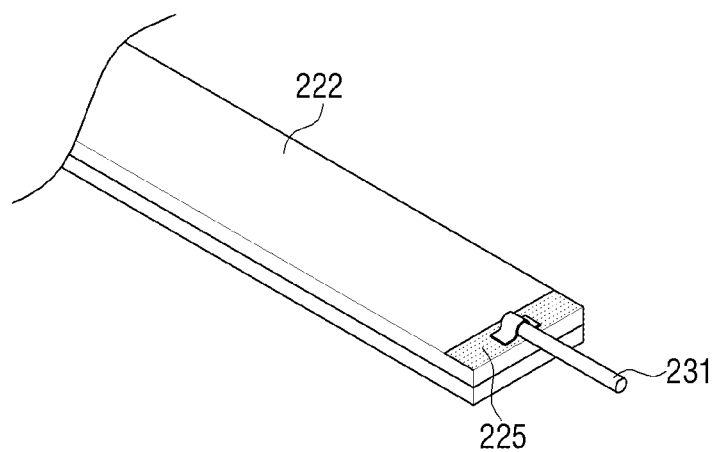
Figure 11A:
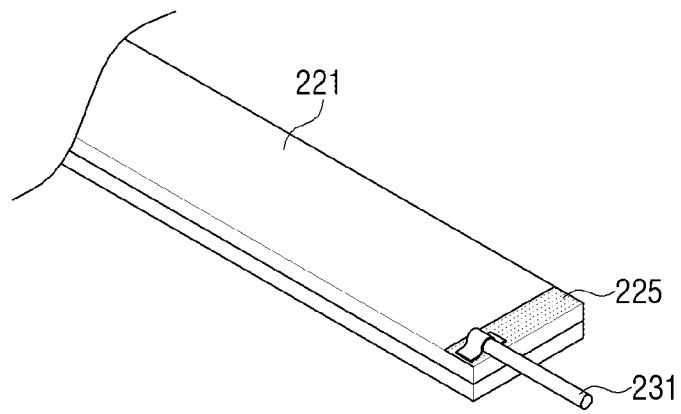
Figure 11B:
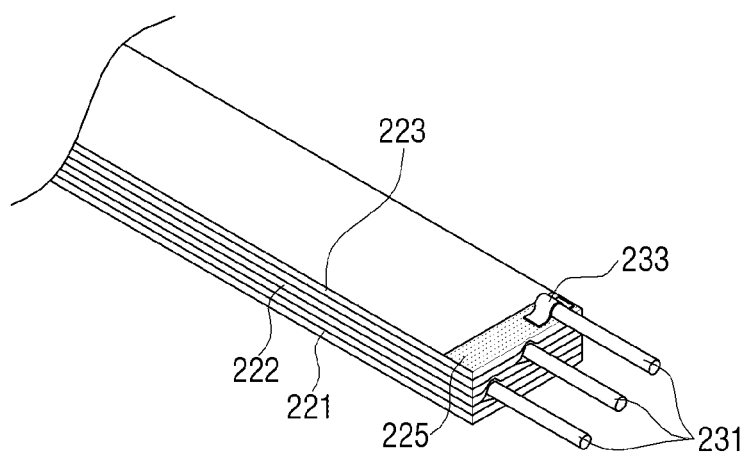
Figure 11C:
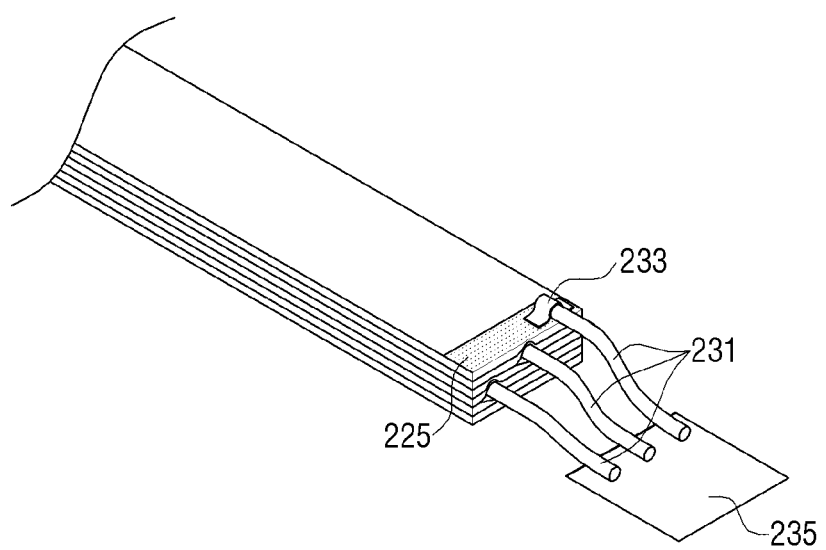

FIGS. 11A to 11C are perspective views describing a method of manufacturing a conducting wire of a power cable according to still another embodiment of the disclosure.

Referring to FIG. 11A, metal electrodes 225 may be formed at the both ends of a transparent electrode 220 formed in a strip shape, and then metal materials 231 having conductivity may be bonded to the metal electrodes 225.

The method of manufacturing the power cable as shown in FIG. 11A corresponds to the step shown in FIG. 10C, and the metal material 231 shown in FIG. 11A has a wire shape, unlike the metal material 230 having a film shape shown in FIG. 10C. The metal wire 231 is provided to allow the transparent electrode 220 to be easily electrically connected to an external circuit.

In the method of manufacturing a power cable according to still another embodiment of the disclosure, the metal wire 231 may be applied. The metal wire 231 may be bonded to the metal electrode 225 of the transparent electrode 220. The metal wire 231 may be bonded to the metal electrode 225 by a bonding portion 233. As a specific method of bonding the metal wire 231 to the metal electrode 225, a method of applying a silver paste or a method of depositing copper may be used.

In this case, since the metal wire 231 has a predetermined height, when a plurality of transparent electrodes 221, 222, and 223 are stacked, both ends thereof may be thickened. To prevent such a problem, the metal wire 231 is disposed on the left of the first transparent electrode 221, the metal wire 231 is disposed on the center of the second transparent electrode 222, and the metal wire 213 is disposed on the right of the third transparent electrode 223.

Referring to FIG. 11B, when the first to third transparent electrodes 221, 222, and 223 are stacked, the metal electrodes 231 are arranged not to overlap each other. Accordingly, the plurality of metal wires 231 may be arranged in a row, and be arranged on almost the same plane.

Referring to FIG. 11C, the plurality of metal wires 231 may be short-circuited to each other using a printed circuit board (PCB). Here, instead of the metal wires 231, flexible flat cables (FFC) or flexible printed circuits (FPC) may be bonded to the metal electrode 231 of the transparent electrode 220 and then be short-circuited using the PCB 235.

A pin 260 for connection to the TV 1 may be bonded to the short-circuited PCB 235 as shown in FIG. 10H.

Figure 12:
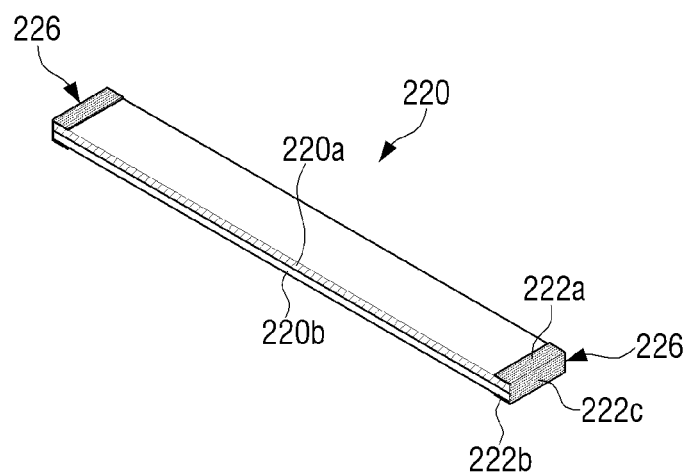
FIG. 12 is a perspective view describing a method of manufacturing a conducting wire of a power cable according to still another embodiment of the disclosure.

FIG. 12 is a perspective view describing a method of manufacturing a conducting wire of a power cable according to still another embodiment of the disclosure.

FIG. 12 shows that, in the step of forming the metal electrode in FIG. 10B, the metal electrodes 226 may be formed from the upper surface 222*a* of the transparent electrode 220 to the lower surface 222*b* thereof across the side surface 222*c* thereof at the ends of the transparent electrode 220. The metal electrode 226 may be formed to surround both ends of the transparent electrode 220. That is, the metal electrode 226 may be formed on a surface of the transparent electrode 220*a* and a surface of the base film 220*b* of the transparent electrode 220.

The metal electrode 226 may be formed over the upper surface 222*a* and the lower surface 222*b*, that is, both surfaces 222*a* and 222*b* of the transparent electrode 220. Accordingly, the transparent electrodes 220 may be short-circuited by stacking a plurality of transparent electrodes 220 and then pressing the stacked transparent electrodes 220 against each other, without bonding a separate metal material thereto.

The metal electrode 226 may be formed by silver paste, copper deposition, or the like.

Meanwhile, after the metal electrodes 225 are formed on a single surface of the transparent electrode 220 at both ends thereof as shown in FIG. 10B, the metal film may be wound from the surface of the metal electrode 225 formed on the upper surface 222*a* of the transparent electrode 220 to the surface of the base film 220*b* that is the lower surface 222*b* of the transparent electrode 220, such that the metal electrodes 226 may be formed to surround both side surfaces 220*a* and 220*b* of the transparent electrode 200.

As described above, the power cable according to the disclosure is formed by surrounding a plurality of transparent conducting wires 210 with one transparent outer coating 250, thereby allowing the power cable 200 to be formed entirely transparent. Therefore, the power cable 200 invisible to the eyes of the users can be provided.

Hereinabove, the disclosure has been described above in an illustrative manner. The terms used herein are for the purpose of description, and should not be construed as limiting. Various modifications and changes of the disclosure are possible in light of the above teachings. Therefore, unless otherwise stated, the disclosure may be freely embodied within the scope of the claims.

The invention claimed is:

1. A power adaptor comprising:
an adaptor body; and
a cable connected to the adaptor body,
wherein the cable includes a plurality of conducting wires which are arranged in parallel and arranged to be spaced apart from one another and an outer coating surrounding the plurality of conducting wires and formed of a transparent material, and
wherein, in each of the plurality of conducting wires, transparent electrodes are repeatedly stacked.

2. The power adaptor as claimed in claim 1, wherein the outer coating is formed in a flat shape.

3. The power adaptor as claimed in claim 1, wherein an interval between the plurality of conducting wires is formed to be greater than a diameter of the conducting wire.

4. The power adaptor as claimed in claim 3, wherein each of the plurality of conducting wires is plated with a material having a metallic gloss.

5. The power adaptor as claimed in claim 3, wherein the cable further includes a plurality of inner coatings surrounding the plurality of conducting wires, respectively, and formed of a transparent material.

6. The power adaptor as claimed in claim 1, wherein the adaptor body includes:
an alternating current (AC)/direct current (DC) converter configured to convert an input AC voltage to a DC voltage;
a main voltage supplier configured to convert the DC voltage to a main voltage;
a standby voltage supplier configured to convert the DC voltage to a standby voltage; and
a switching unit configured to transmit the DC voltage to one of the main voltage supplier and the standby voltage supplier according to a mode selection signal applied from an electronic device to which the cable is connected.

7. The power adaptor as claimed in claim 6, wherein the plurality of conducting wires include a main power line connected to the main voltage supplier, a standby power line connected to the standby voltage supplier, a signal line connected to the switching unit, and a ground line, and
the main power line and the ground line are disposed between the standby power line and the signal line.

8. The power adaptor as claimed in claim 7, wherein the plurality of conducting wires include a plurality of the main power lines and a plurality of the ground lines.

9. The power adaptor as claimed in claim 7, wherein the standby power line and the signal line are disposed at outer portions of the cable.

10. The power adaptor as claimed in claim 9, wherein the power adaptor further includes a pin terminal portion in which a plurality of pins connected to the cable are arranged in a row and protrude outward, and a connector including a socket portion in which pin receiving holes receiving the plurality of pins are formed, and lengths of a pin connected to the standby power line and a pin connected to the signal line are shorter than those of a pin connected to the main power line and a pin connected to the ground line.

11. A power cable comprising:

a plurality of conducting wires which are arranged in parallel and arranged to be spaced apart from one another; and an outer coating surrounding the plurality of conducting wires and formed of a transparent material, wherein the outer coating is flat, and is formed to transmit external light, and wherein, in each of the plurality of conducting wires, a plurality of transparent electrodes are stacked.

12. The power cable as claimed in claim 11, wherein the plurality of conducting wires has a circular cross-section, and are spaced apart from one another by an interval larger than a diameter of the conducting wire.

13. The power cable as claimed in claim 11, wherein the transparent electrode is formed in a thin-film shape.

\* \* \* \* \*